(12) United States Patent
Nonaka et al.

(10) Patent No.: US 7,234,819 B2
(45) Date of Patent: Jun. 26, 2007

(54) PROJECTOR SYSTEM AND CAMERA SYSTEM

(75) Inventors: Osamu Nonaka, Sagamihara (JP); Kazuhiro Sato, Sagamihara (JP)

(73) Assignee: Olympus Corporation, Toyko (JP)

( * ) Notice: Subject to any disclaimer, the term of this patent is extended or adjusted under 35 U.S.C. 154(b) by 261 days.

(21) Appl. No.: 10/952,066

(22) Filed: Sep. 28, 2004

(65) Prior Publication Data

US 2005/0068501 A1   Mar. 31, 2005

(30) Foreign Application Priority Data

Sep. 30, 2003  (JP)  ............... 2003-341161
Sep. 30, 2003  (JP)  ............... 2003-341162

(51) Int. Cl.
G03B 21/00   (2006.01)
G03B 3/00    (2006.01)
G03B 21/14   (2006.01)
H04N 3/22    (2006.01)

(52) U.S. Cl. .................. 353/69; 353/101; 353/122; 348/745

(58) Field of Classification Search .................. 353/30, 353/69, 70, 121, 122; 348/745, 746, 747, 348/806
See application file for complete search history.

(56) References Cited

U.S. PATENT DOCUMENTS 6,592,228 B1 *  7/2003  Kawashima et al. ........ 353/101
6,670,603 B2 * 12/2003  Shimada et al. ............ 250/235
6,846,081 B2 *  1/2005  Mochizuki et al. .......... 353/70
7,055,958 B2 *  6/2006  Tajima ....................... 353/69
7,125,122 B2 * 10/2006  Li et al. ....................... 353/31
2004/0165154 A1 * 8/2004 Kobori et al. ............... 353/69

FOREIGN PATENT DOCUMENTS

| JP | 08-032948 | 2/1996 |
| JP | 11-187178 | 7/1999 |
| JP | 2000-222163 | 8/2000 |

* cited by examiner

*Primary Examiner*—Melissa Jan Koval
(74) *Attorney, Agent, or Firm*—Straub and Pokotylo; John C. Pokotylo

(57) ABSTRACT

A projector system of this invention includes a camera and a projector. The projector includes a projection image forming unit which forms an image to be projected to a projection surface and a projecting lens. When photographic information in photographing a projection image and distance information to the projection surface are input, a display control unit controls the focal length of the projecting lens in accordance with the photographic information and switches the size of the image formed by the projection image forming unit at the variable control limit of the focal length.

9 Claims, 12 Drawing Sheets

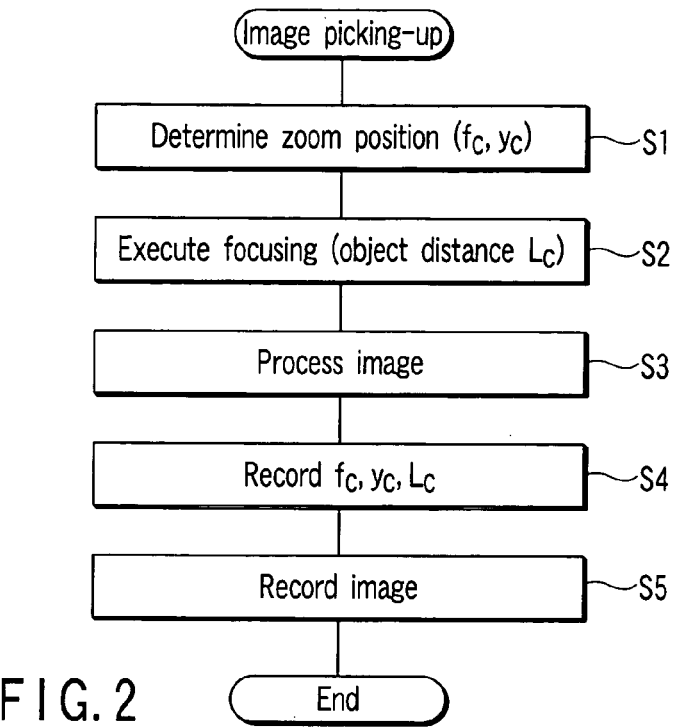
FIG. 2
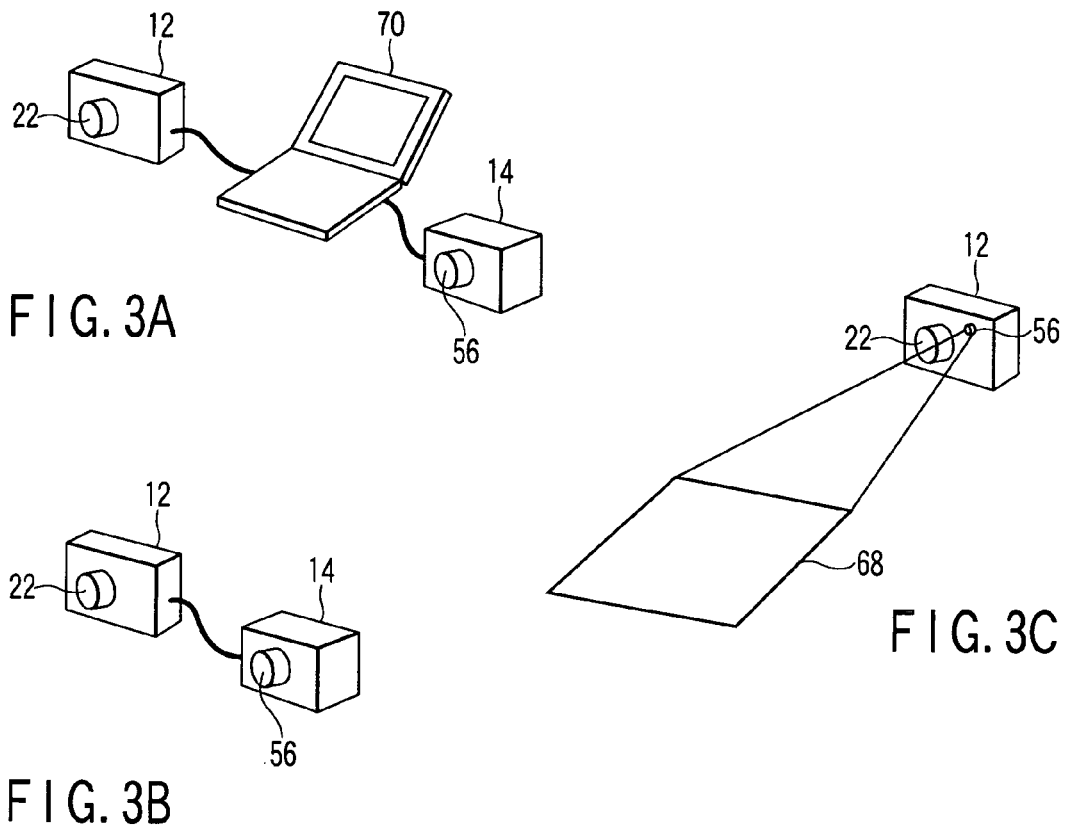
FIG. 3A
FIG. 3B
FIG. 3C

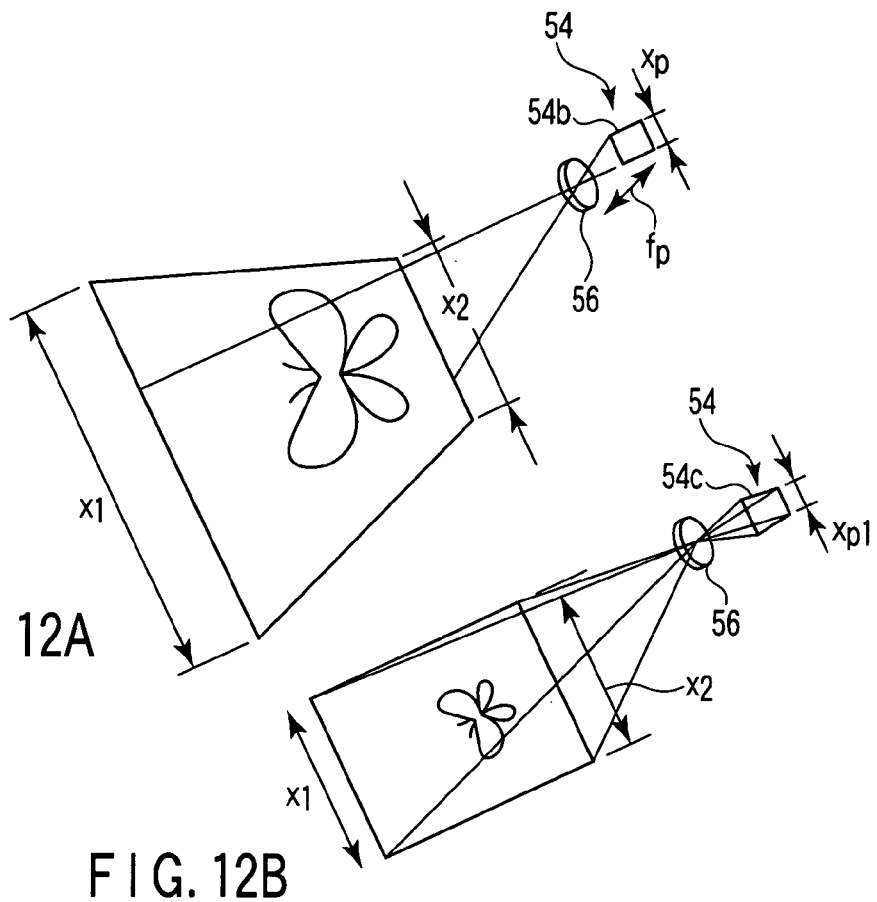
FIG. 12A
FIG. 12B
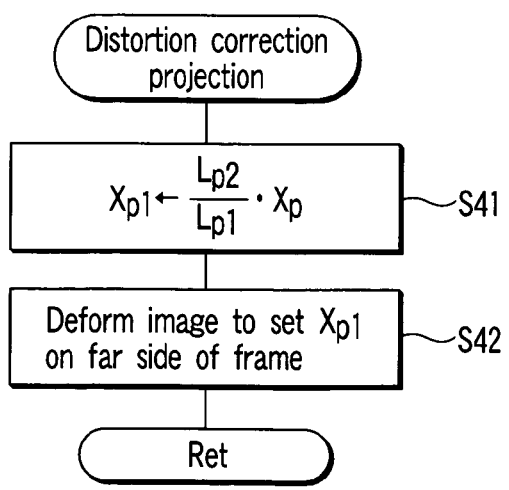
FIG. 13

PROJECTOR SYSTEM AND CAMERA SYSTEM

CROSS-REFERENCE TO RELATED APPLICATIONS

This application is based upon and claims the benefit of priority from prior Japanese Patent Applications No. 2003-341161, filed Sep. 30, 2003; and No. 2003-341162, filed Sep. 30, 2003, the entire contents of both of which are incorporated herein by reference.

BACKGROUND OF THE INVENTION

1. Field of the Invention

The present invention relates to an improvement of a projector system which projects a photographed image for the purpose of appreciation and a camera system having a projector function.

2. Description of the Related Art

Various kinds of photo reproduction methods have been proposed conventionally. As a traditional method of reproducing photographed images, they are printed on sheets of photographic printing paper or the like. Except reproduction on a display, a method is also known which projects images on the surface of a wall by using a so-called projector for the purpose of appreciation.

A technique is also known which reproduces a photographed image in life size, like a technique for projecting an image of a person in life size to produce reality, although its technical field is different from photography. In the technique disclosed in Jpn. Pat. Appln. KOKAI Publication No. 8-032948, an anti-vibration display mechanism is mounted in a finder optical system.

On the other hand, projectors are becoming popular in recent years. Accordingly, compact and portable products have been introduced. They have received a great deal of attention as video display means. An immediate merger between the projectors and the conventional photo culture is demanded.

Jpn. Pat. Appln. KOKAI Publication No. 11-187178 discloses a technique in which an electronic blackboard and a projector are combined, and data is synthesized by communication between them. Jpn. Pat. Appln. KOKAI Publication No. 2000-222163 discloses a technique in which projection by a projector is switched by, e.g., changing the viewer in accordance with the film type.

BRIEF SUMMARY OF THE INVENTION

It is an object of the present invention to provide a projector system and camera system, which reproduce an object or a situation independently of the photographic state or apparatus or the state at the time of reproduction.

As a characteristic feature of the present invention, there is provided a projector system which includes a projector, the projector including a projection image forming unit which forms an image to be projected to a projection surface and a projecting lens, comprising:

an input unit which inputs photographic information in photographing a projection image and distance information to the projection surface; and an image switching unit which switches a size of the image formed by the projection image forming unit, in accordance with the photographic information and the distance information.

As another characteristic feature of the present invention, there is provided a projector system comprising:

a projector which forms an image and projects the image to a projection surface;

a projection surface detection unit which detects a state of the projection surface; and a control unit which controls to switch the image to be projected, in accordance with the state of the projection surface detected by the projection surface detection unit.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a flowchart for explaining the operation sequence in photography by the camera having the arrangement shown in FIG. 1;

FIGS. 3A to 3C are views showing configuration examples of the projector system according to the present invention;

FIGS. 12A and 12B are views for explaining another example of the projected image according to the second embodiment of the present invention;

FIG. 13 is a flowchart for explaining the distortion correction projecting operation according to the second embodiment;

DETAILED DESCRIPTION OF THE INVENTION

The embodiments of the present invention will be described below with reference to the accompanying drawing.

FIRST EMBODIMENT

Figure 1:
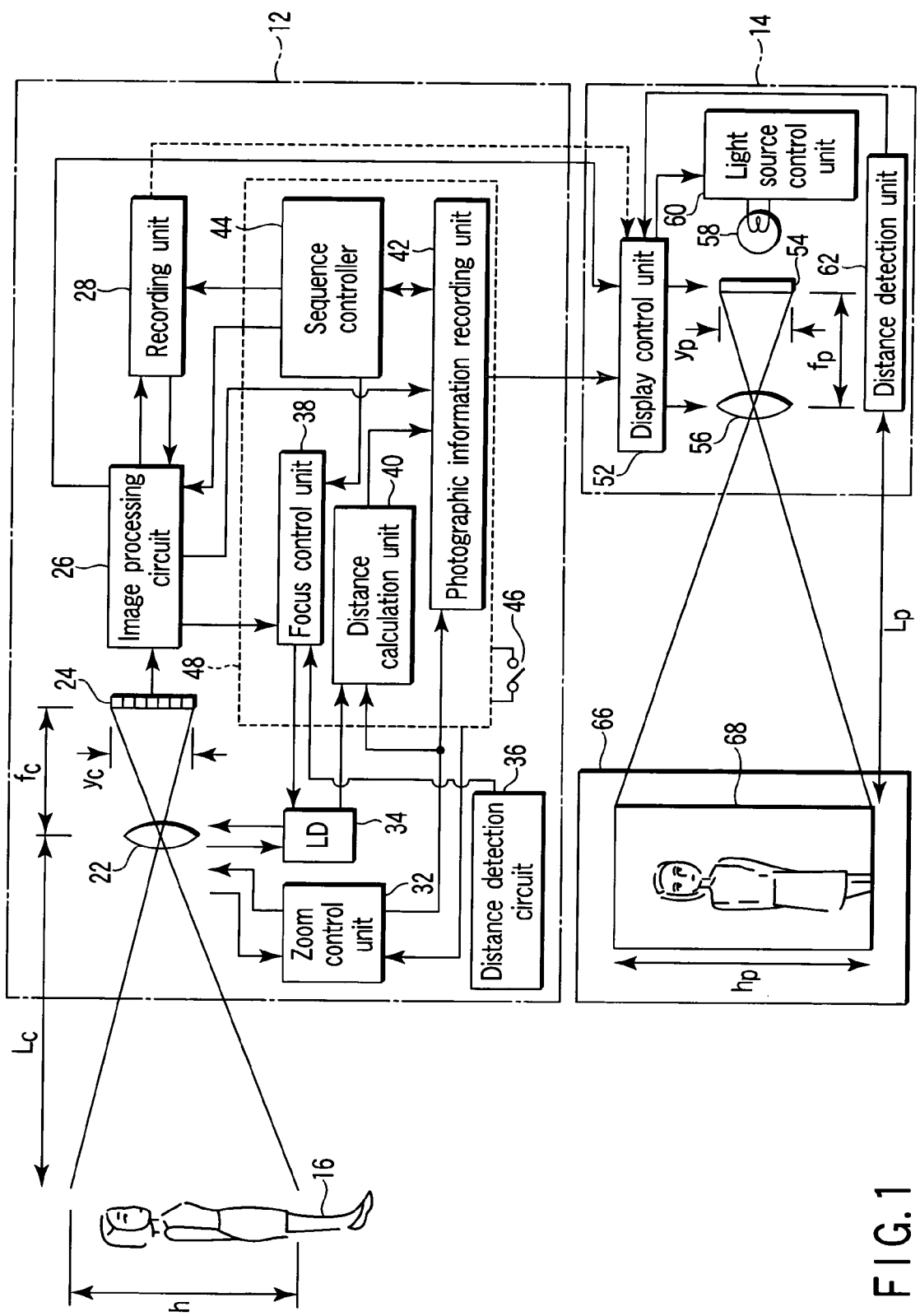
FIG. 1 is a block diagram showing the arrangement of the electric system of a projector system according to the first embodiment of the present invention.

FIG. 1 is a block diagram showing the arrangement of the electric system of a projector system according to the first embodiment of the present invention.

Referring to FIG. 1, the projector system includes a camera 12 and a projector 14.

The camera 12 includes a photographic lens 22 to photograph an object 16, image pickup element 24, image processing circuit 26, recording unit 28, zoom control unit 32, lens position control (LD) unit 34, distance detection circuit 36, focus control unit 38, distance calculation unit 40, photographic information recording unit 42, sequence controller 44, and operation switch 46. A microcomputer 48 includes the focus control unit 38, distance calculation unit 40, and photographic information recording unit 42 which serve as a means for calculating and determining various kinds of information on the basis of signals obtained from the functions and the sequence controller 44 which detects a photographer's operation and sequentially controls the functions.

On the other hand, the projector 14 includes a display control unit 52, projection image forming unit 54, projecting lens 56, projection light source 58, light source control unit 60, and distance detection unit 62.

In the camera 12, an object image formed on the image pickup element 24 through the photographic lens 22 is converted into an electrical or digital image signal by the image pickup element 24 serving as an input means and the image processing circuit 26. The converted electrical signal is recorded in the recording unit 28.

To obtain an object image in a satisfactory state as intended by the photographer, the scaling ratio of the photographic lens 22 can be changed by the zoom control unit 32. In addition, the focal position of the photographic lens 22 is controlled by the lens position control unit 34. The zoom magnification of the photographic lens 22 is changed by the operation switch 46 operated by the photographer.

The focal position of the photographic lens 22 can be controlled by the focus control unit 38 on the basis of the output from the distance detection circuit 36. Alternatively, it may be controlled on the basis of contrast information of image data obtained from the output from the image processing circuit 26 such that the contrast becomes high.

In focusing based on the contrast, distance information is calculated by the distance calculation unit 40 on the basis of the zoom position or focus lens position. Information at the time of photography is calculated on the basis of the zoom position or calculated distance information. The information contains, e.g., an object distance $L_c$, a focal length $f_c$ of the photographic lens 22, and a use range $y_c$ of the image pickup element 24 shown in FIG. 1. These pieces of information are recorded in the photographic information recording unit 42.

In the projector 14, the display control unit 52 serving as a control means and image switching means controls the units such as the projecting lens 56, projection image forming unit 54, and light source control unit 60 in the projector 14 by using the outputs from the image processing circuit 26 or information in the photographic information recording unit 42 in the camera 12. Accordingly, a zoom magnification $f_p$ of the projecting lens 56, and effective part $y_p$ of the projection image forming unit 54, and the brightness of the projection light source 58 are controlled.

In the projector 14, distance information $L_p$ from the projector 14 to a wall surface or screen (projection surface) 66 on which an image should be projected can be detected by the distance detection unit 62 serving as an input means. Focusing of the projecting lens 56 may be done on the basis of this information by the display control unit 52. Reference numeral 68 in FIG. 1 denote a frame in which an object image projected on the projection surface 66 such as a wall surface of screen is displayed.

FIG. 2 is a flowchart for explaining the operation sequence in photography by the camera having the above-described arrangement.

The photographic operation is executed under the control of the sequence controller 44.

First, in step S1, the zoom position and the image picking-up surface size $y_c$ in photography are determined. In step S2, focusing is executed. The distance information $L_c$ is detected from a result of focusing.

When photographed image processing is done in step S3, the pieces of information ($f_c$, $y_c$, and $L_c$) as the results obtained in steps S1 and S2 described above are recorded in the photographic information recording unit 42. In step S5, an image based on the pieces of photographic information is recorded in the recording unit 28.

The image recorded in the recording unit 28 may be recorded in the photographic information recording unit 42 together with the above-described photographic information.

In the projector system having the above-described arrangement, a personal computer 70 serving as an interface may be inserted between the camera 12 and the projector 14, as shown in FIG. 3A. In this case, the display control unit 52 shown in FIG. 1 is arranged in the personal computer 70.

The recording unit 28 may be removed from the camera 12 and inserted to the personal computer 70 such that control can be executed on the basis of information in the recording unit 28.

Alternatively, the camera 12 and projector 14 may be connected directly, as shown in FIG. 3B. Even in this case, image information and photographic information may be input to the recording unit 28, and only the memory of the recording unit 28 may be inserted to the projector 14 such that image projection control can be executed while reflecting the photographic information.

The light source unit conventionally tends to be bulky. When its size is reduced by using, e.g., an LED, the camera 12 can incorporate the projector 14, as shown in FIG. 3C. In this case, when the optical system (projecting lens) 56 of the projector 14 is incorporated in part of the body of the camera 12, both photography and projection can be done by a single device.

The technique of the present invention can cover all of such modifications.

Figure 4:
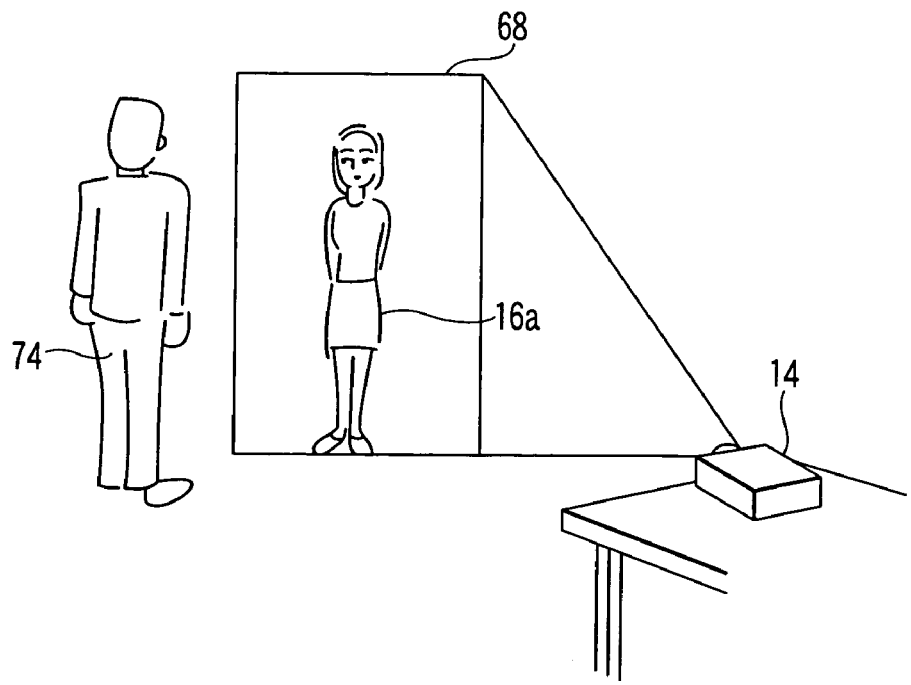
FIG. 4 is a view showing an example of a photographed image appreciation method according to the first embodiment of the present invention.

FIG. 4 is a view showing an example of a photographed image appreciation method according to this embodiment.

Referring to FIG. 4, an object image 16a in the frame 68 projected by the projector 14 is displayed in life size. Hence, an appreciator 74 can appreciate an object with reality which is different from an image simply displayed on a small monitor or on a print.

Figure 5:
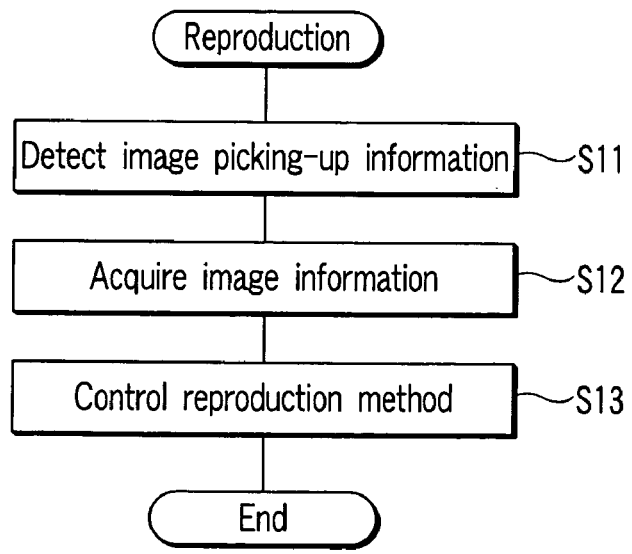
FIG. 5 is a flowchart for explaining the image reproduction operation of the projector according to the first embodiment.

To realize this appreciation method, photography is executed in accordance with the sequence shown in FIG. 2 by using the camera 12 having the arrangement shown in FIG. 1, and after that, reproduction operation is executed in accordance with the operation sequence shown in FIG. 5 by using the projector 14.

The reproduction operation is performed under the control of the display control unit 52.

In step S11, photographic information acquired by the camera 12 is detected by the display control unit 52. In step S12, image information recorded in the recording unit 28 or photographic information recording unit 42 is obtained. In step S13, an image based on the acquired image information is controlled by an appropriate method and projected to the projection surface 66 such as a wall surface or screen.

Figure 6:
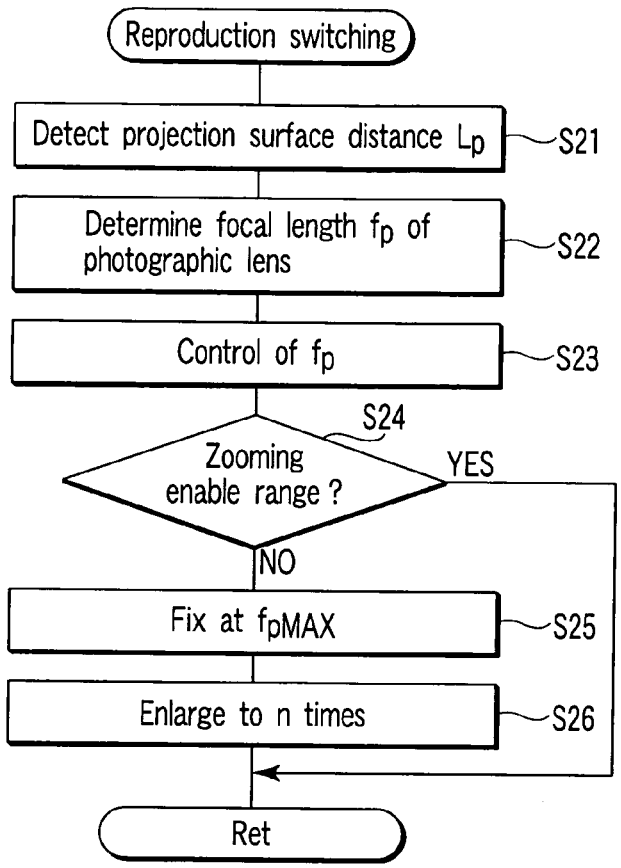
FIG. 6 is a flowchart for explaining the reproduction switching operation according to the first embodiment.

When control is executed on the basis of the flowchart shown in FIG. 6, a satisfactory life-size image can be obtained regardless of the projection position.

FIG. 6 is a flowchart for explaining the reproduction switching operation.

The reproduction switching operation is done under the control of the display control unit 52.

First, in step S21, the distance $L_p$ to the projection surface is detected by the projector 14, as shown in FIG. 1. In step S22, using the distance $L_p$ to the projection surface obtained in step S21 as well as the focal length $f_c$ of the photographic lens 22, object distance $L_c$, and the use range $y_c$ of the image picking-up element 24 obtained in advance in photography, the focal length $f_p$ of the projecting lens 56 is determined by $$f_p = f_c \cdot (L_p/L_c) \cdot (y_p/y_c) \quad (1)$$

where $y_p$ is the size of the projection image forming unit 54 (FIG. 1). The size ratio to the image picking-up surface of the camera is obtained by $y_p/y_c$.

In step S23, the zoom position is controlled to the focal length $f_p$. In step S24, it is determined whether the focal length $f_p$ falls within the zooming enable range. If YES in step S24, this routine is ended, and projection is executed at the zoom position. This is because a high image quality can be obtained by effectively using the projection image forming unit 54 in its full size.

However, the zooming enable range is limited. If enlargement reaches its limit, the flow advances to step S25 to additionally execute so-called electronic zooming. At this time, the optical zoom position by the lens is fixed at a maximum value $f_{pMAX}$. On the premise of it, in step S26, the size of the image formed on the projection image forming unit 54 is increased to n times as a desired magnification in accordance with $$n = (f_c/f_{pMAX}) \cdot (L_p/L_c) \cdot (y_p/y_c) \quad (2)$$

In this way, optical zooming is done with higher priority, and electronic zooming is used as an auxiliary. Hence, image projection at a high resolution can be executed.

Figure 7:
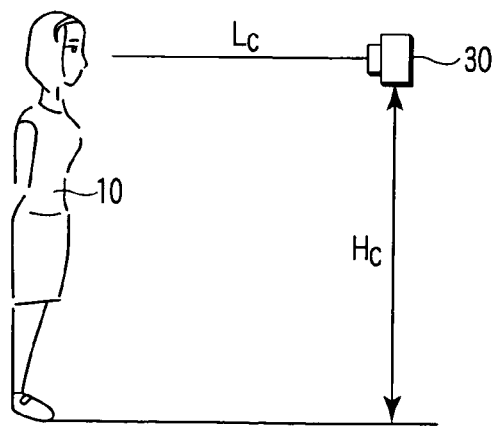
FIG. 7 is a view for explaining the height of a camera 12 from the floor in photography.
Figure 8:
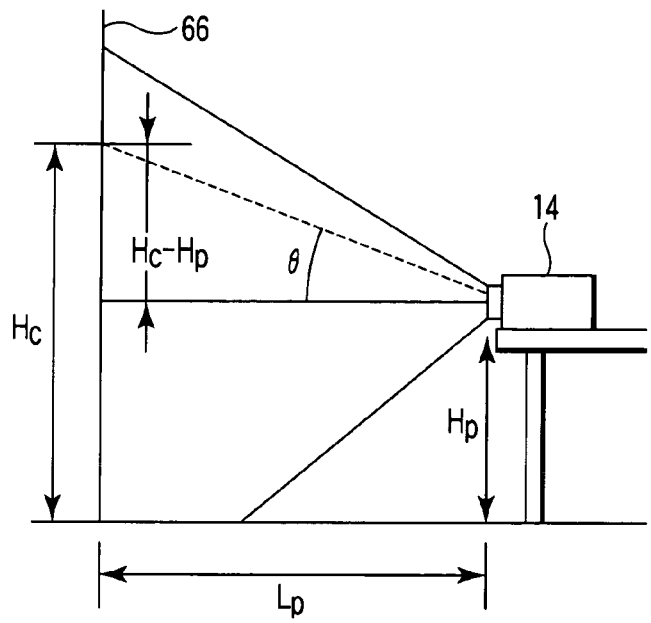
FIG. 8 is a view for explaining the height of a projector 14 in installation in projecting an image.

As shown in FIG. 7, a value $H_c$ corresponding to the height of the camera 12 or the height of the object 16 in photography is input. In this case, the projected image can be displayed in accordance with the actual height of the object in consideration of even a height $H_p$ of the projector 14 in installation, as shown in FIG. 8.

More specifically, when an object image corresponding to the height $H_c$ of the object 16 is projected to the projection surface 66 such as a wall, a more realistic photographed image with visual impact can be appreciated, as shown in FIG. 4.

Figure 9:
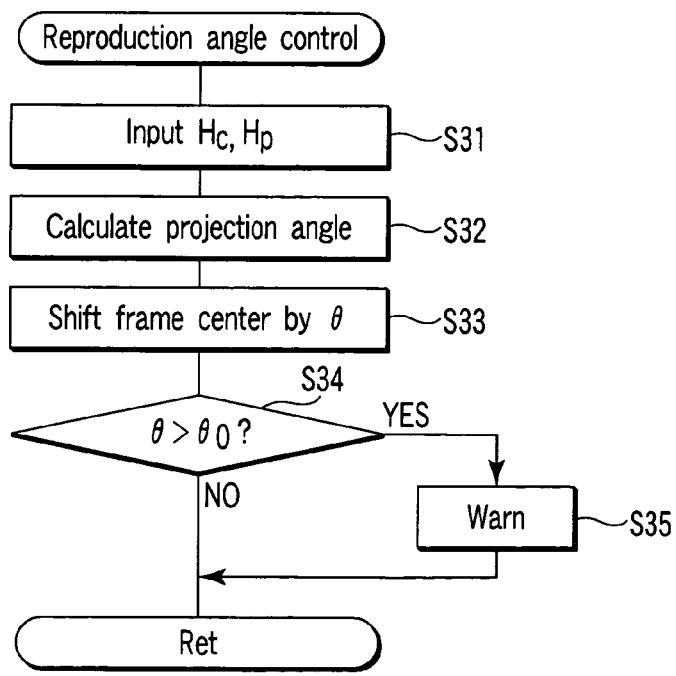
FIG. 9 is a flowchart for explaining the reproduction angle control operation according to the first embodiment.

The difference ($H_c - H_p$) between the height $H_p$ of the projector 14 and the height $H_c$ of the camera 12 can be generated by tilting the projection surface by an angle θ by, e.g., turning the projection surface up. The reproduction angle of the projector 14 is controlled in accordance with the flowchart shown in FIG. 9.

The reproduction angle control operation is executed under the control of the display control unit 52.

First, in step S31, the heights $H_c$ and $H_p$ are input to the camera 12 and projector 14. In step S32, using the heights $H_c$ and $H_p$ input in step S31 and the already detected projector distance $L_p$, the projection angle θ is calculated by $$\theta = \arctan((H_c - H_p)/L_p) \quad (3)$$

In step S33, the projecting direction is switched by the angle θ. Since the photographic angle is limited, the angle θ is determined in step S34. If the angle θ is equal to or smaller than a predetermined value $\theta_0$, this routine is ended. If the angle θ exceeds the predetermined value $\theta_0$, the flow advances to step S35 to perform warning.

Figures 10A, 10B:
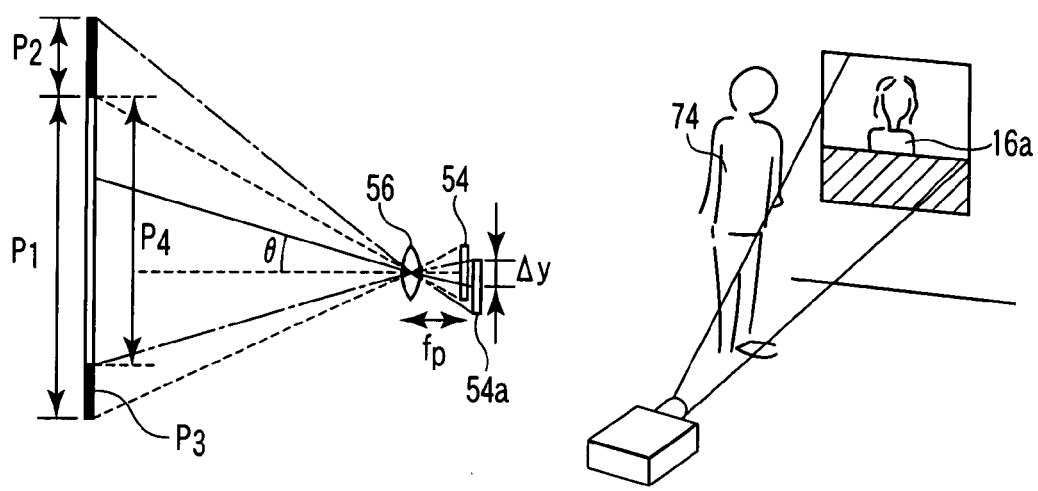
FIGS. 10A and 10B are views showing an example of projecting direction switching.

FIGS. 10A and 10B are views showing an example of projecting direction switching.

In this embodiment, instead of changing the projecting direction of the projector 14 itself, the center of the frame is shifted up by the angle θ by shifting the image formed on the projection image forming unit 54 by Δy (Δy=$f_p$ tan θ), as indicated by 54a.

A portion which is actually displayable on the projection surface is indicated by $P_1$ in FIG. 10A. The image of an additional display portion $P_2$ in FIG. 10A is lost. The image of the lower portion (indicated by $P_3$) corresponding to the shift Δy is also absent because no data is present. The image 16a on the image reproduction portion $P_4$ is displayed in the same height as that of the actual object 16, as shown in FIG. 10B. Accordingly, the appreciator 74 can appreciate the image while sensing the height or accurate face size of the object with reality.

SECOND EMBODIMENT

The second embodiment of the present invention will be described next.

In the first embodiment, a projector system having the camera 12 and the projector 14 separated from the camera 12 has been described. In the second embodiment, a camera with projector having the above-described arrangement shown in FIG. 3C will be explained.

The basic arrangement and operation of the second embodiment are the same as in the above-described first embodiment. The same reference numerals as in FIGS. 1 to 10B denote the same parts, and an illustration and description thereof will be omitted. Only different operations will be described below.

Figure 11A:
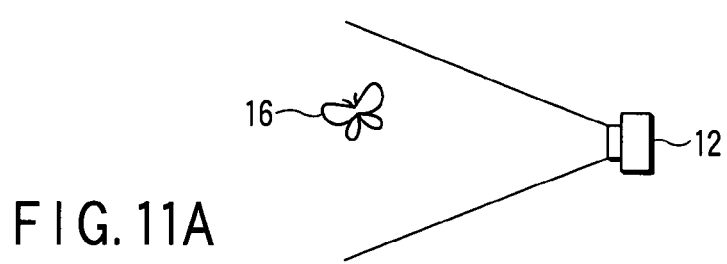
FIGS. 11A to 11C are views for explaining an example of a projected image according to the second embodiment of the present invention.
Figure 11B:
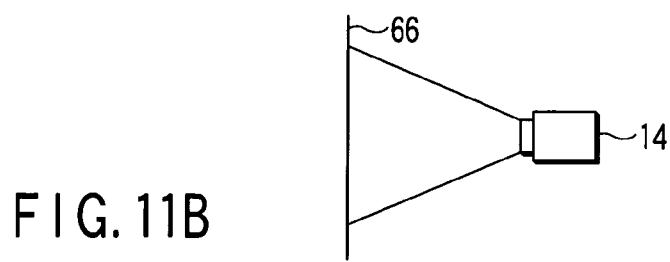

In this case, an object 16 is photographed as shown in FIG. 11A. This object image cannot accurately be reproduced as a realistic image only by simply displaying it on a projection surface 66, as shown in FIG. 11B. The reason for this is as follows.

Figure 11C:
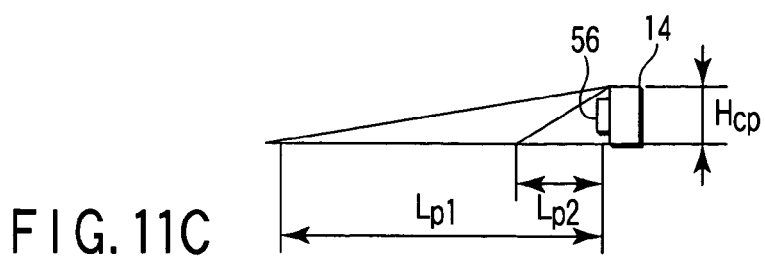

As shown in FIG. 11C, the position where the upper portion of the image is projected is separated from a camera 12 by $L_{p1}$. The lower portion of the image is projected at a position separated from the camera 12 by $L_{p2}$. When $L_{p1}$ and $L_{p2}$ have a large difference, a distorted image is obtained, as shown in FIG. 12A. In this case, the portion far apart from the camera is enlarged, and the close portion is not so greatly enlarged. For this reason, distortion correction as shown in the flowchart of FIG. 13 needs to be performed.

As shown in FIG. 12A, if an image 54a formed on a projection image forming unit 54 remains rectangular, the upper portion of the image has a width $x_1$, and the lower portion has a width $x_2$ ($x_1 > x_2$), as is represented by $$x_1 = (L_{p1}/f_p) \cdot x_p \quad (4)$$
$$x_2 = (L_{p2}/f_p) \cdot x_p$$
$$x1 = x2 = (L_{p1}/f_p) \cdot (L_{p2}/L_{p1}) \cdot x_p$$
$$= (L_{p1}/f_p) \cdot x_{p1}$$

Hence, as shown in FIG. 12B, the image on the projection image forming unit 54 is corrected to a trapezoidal shape (54c) such that $x_1 = x_2$ can hold. In equation (4), $f_p$ is the focal length of a projecting lens 56, and $x_p$ is the width of the projection image forming unit 54. In this example, one side of the projection image is reduced from $x_p$ to $x_{p1}$ to suppress enlargement on the upper portion of the image.

Referring to the flowchart shown in FIG. 13, in step S41, $x_{p1}$ is calculated. A height $H_{cp}$ of the projection unit of the camera 12 is determined in advance, as shown in FIG. 11C. If projection should be executed on, e.g., a desk, $L_{p1}$ and $L_{p2}$ are determined in advance on the basis of the projection angle. In step S42, the image on the projection image forming unit 54 is changed to a trapezoidal shape to correct the projected image.

When this distortion correction is combined with the technique for accurately reproducing the size of the object image as described with reference to the flowcharts shown in FIGS. 5 and 6, a camera with reproduction device which can cause, e.g., a butterfly in life size to flutter on a desk can be provided.

As described above, according to the second embodiment, a camera system with projector can be provided, which requires no screen or the like installed on the projection surface and can therefore execute accurate image reproduction only by placing the device.

In this way, when a projector with a high degree of freedom in image size control is used, a photo display form or photo appreciation form with high reproducibility can be provided.

THIRD EMBODIMENT

The third embodiment of the present invention will be described next.

Figure 14:
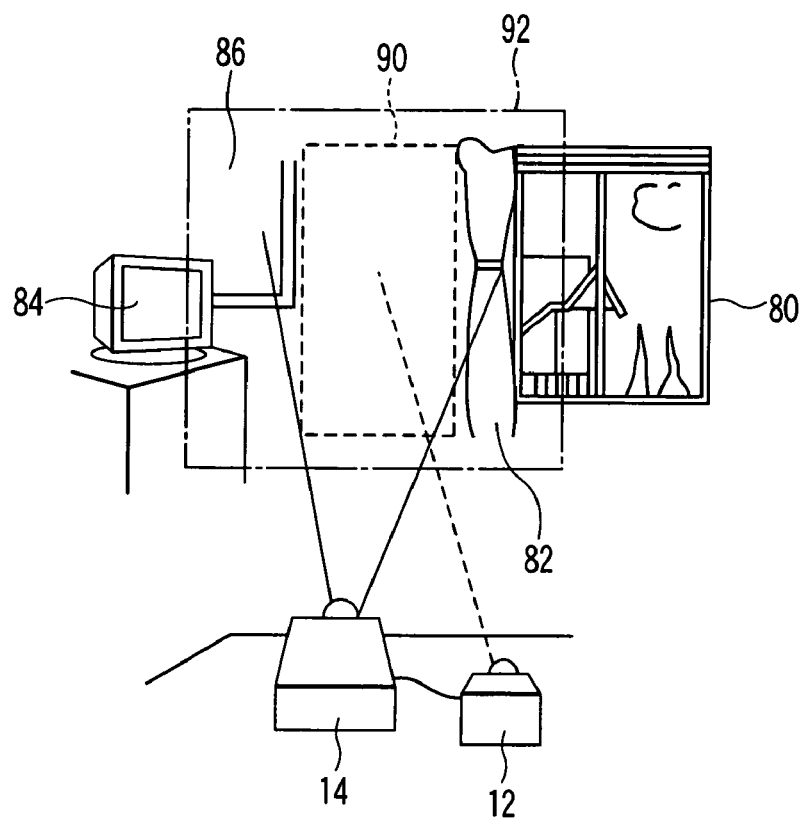
FIG. 14 is a view showing the state of a wall surface on which an image is projected by a projector 14 according to the third embodiment of the present invention.

FIG. 14 is a view showing the state of a wall surface on which an image is projected by a projector 14 according to the third embodiment of the present invention.

A wide wall surface is available in an office or school. In ordinary home or the like, a flat surface wide enough for a projector to project an image can hardly exist. In the example shown in FIG. 14, objects such as a window 80, curtain 82, TV set 84, and picture frame 86 are present in a room. Only an area 90 without such objects is the wall surface appropriate for projection by a projector. The reasons for this are as follows. An image projected on, e.g., the curtain 82 or TV set 84 is distorted because of the change in projection distance. An image projected on the picture frame 86 changes its color. An image projected on the window 80 is invisible.

Under these circumstances, in this embodiment, an appropriate image projection portion is selected, and projection suitable for that portion is executed. The user only needs to properly install the projector 14 toward a wall surface. Then, the projector 14 projects an image to an effective projection portion. Hence, the user can easily enjoy an image free from distortion with good color reproducibility.

More specifically, in the third embodiment, the projector 14 displays a photographed image of a camera 12. These devices can effectively be connected to each other to transmit/receive signals except image information so that the image pickup element or distance detection function of the camera 12 can effectively be used. Alternatively, a dedicated projector may incorporate the functions of the camera 12.

An image pickup element 24 of the camera 12 can observe the state of the wall surface by monitoring an area 92 shown in FIG. 14. The image pickup element 24 including an area sensor can also detect colors. The image pickup element 24 can therefore determine a portion which is uniform in both the three-dimensional pattern and the color distribution.

Figures 15A, 15B, 15C:
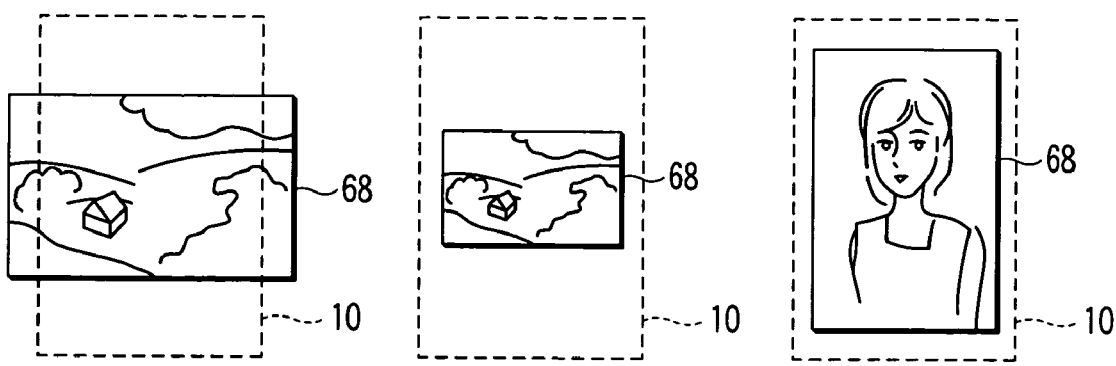
FIGS. 15A to 15C are views for explaining an effective area 90 and a projected image 68.

When the effective area 90, i.e., the uniform projection surface is determined, an image 68 can be prevented from being projected beyond that area and extending off it, as shown in FIG. 15A. That is, as shown in FIG. 15B, the image 68 is reduced. Accordingly, the entire image within the effective range (area 90) can be enjoyed.

The image shown in FIG. 15A is a landscape image and falls outside the area. However, a portrait image as shown in FIG. 15C falls within the effective area 90. This image is projected without being reduced. Such portrait/landscape information about an image is also contained in photographic data sent from the camera 12.

Whether the image 68 will fall outside the effective area 90, as shown in FIG. 15A, can be determined on the basis of the height or width $h_p$ of the projected image shown in FIG. 1. The value $h_p$ can be calculated by $h_p = L_p \times (y_p/f_p)$ where $f_p$ is the focal length of the projecting lens 56, $y_p$ is the size of a projection image forming unit 54 of the projector 14, and $L_p$ is the projection distance.

The above example has been described on the basis of the vertical size of the frame. The same concept can apply to the horizontal size. That is, the value $h_p$ is set such that it falls within the effective area 90. The height and width of the effective area 90 can be obtained from the focal length $f_c$ of a photographic lens 22, a size $y_c$ of a image pickup element 24, and a distance $L_c$. More specifically, when $L_c \approx L_p$, $h = L_p \times (y_c/f_c)$. When only a portion $y_{c1}$ of the size $y_c$ of the image pickup element 24 is effective because of the absence of any change in color or contrast, one side of the effective area 90 can be calculated by $h_1 = L_p \times (y_{c1}/f_c)$.

The width $h_1$ of the effective area 90 is obtained in this way. The value $h_p$ only needs to be smaller than the width $h_1$. The projector 14 executes the width $y_p$ of the image formation region or the focal length $f_p$ of the projecting lens 56 to satisfy $h_p < h_1$.

At this time, image photographic information is also taken into consideration. The image is projected in accordance with the shorter side (e.g., the horizontal direction in the example shown in FIGS. 15A to 15C) of the effective area 90.

Figure 16:
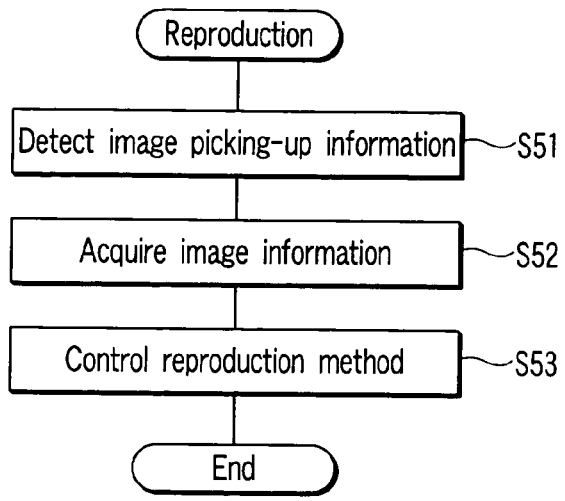
FIG. 16 is a flowchart for explaining the image reproduction operation of the projector according to the third embodiment of the present invention.

FIG. 16 is a flowchart for explaining the projection image reproduction operation.

The reproduction operation is executed under the control of a display control unit 52.

In step S51, the focal length and distance information obtained on the side of the camera 12 are detected by the display control unit 52. In step S52, image information such as a portrait/landscape composition recorded in a recording unit 28 or photographic information recording unit 42 is obtained. In step S53, an image based on the acquired image information is projected to a projection surface 66 such as a wall surface or screen by controlling the zoom magnification or image formation area of the projector 14.

As described above, a system which can execute optimum image reproduction only by placing the projector can be provided.

When information of the camera is to be effectively used, alignment between the camera and the projector is important. For example, when the arrangement shown in FIG. 17 is employed, a system which can automatically detect the effective area only directing the camera unit and projector unit to almost the same direction can be obtained.

In this embodiment, a projector system 100 includes a camera unit and a projector unit. In the projector system 100, even when the projecting direction of the projector is different from the direction of the camera for wall surface monitoring, the difference is canceled by projecting a reference signal.

Figure 17:
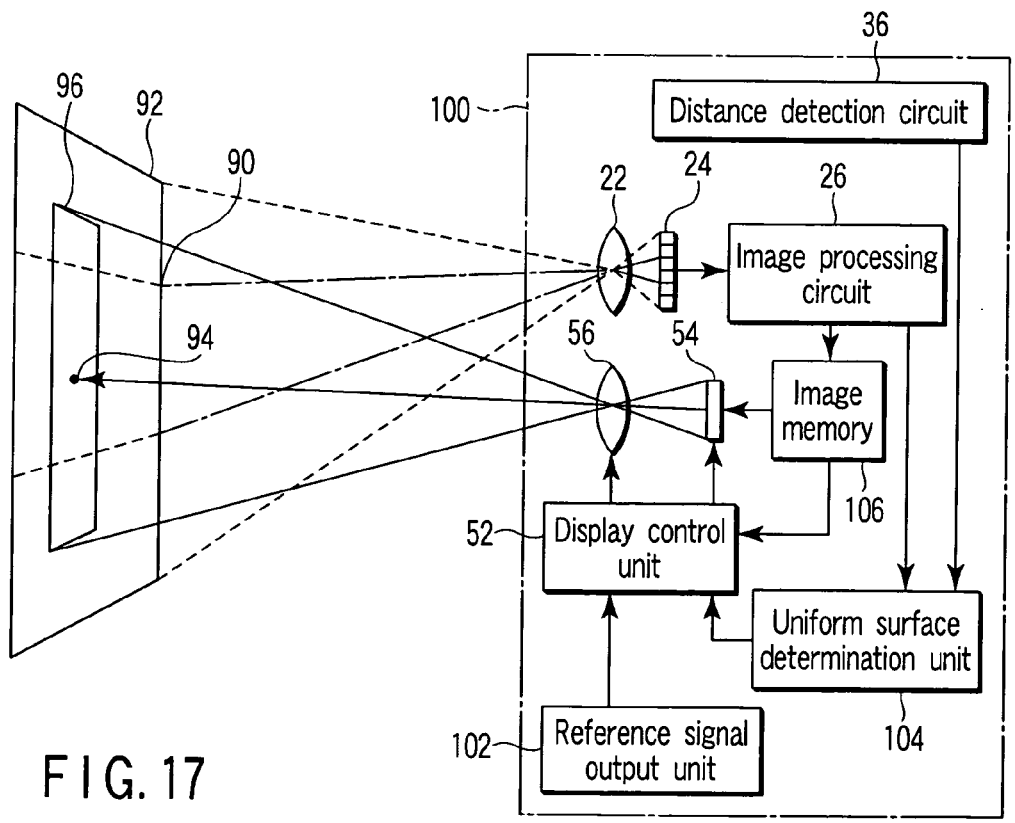
FIG. 17 is a view for explaining alignment of the camera and projector.

Referring to FIG. 17, the projector system 100 has a reference signal output unit 102 which has a function of projecting a reference image indicated by a reference point 94 to the center of the frame. A uniform surface determination unit 104 can accurately determine the positional relationship of the uniform surface and the direction of the projector by determining the position on the image pickup element 24 of the monitor camera where the reference point 94 can be detected.

On the monitor camera side, the camera can determine, from the monitor range 92, a portion without any change in contrast or color on the basis of an image signal obtained from the image pickup element 24 through the photographic lens 22. The uniform surface determination unit 104 determines a portion appropriate for image projection by the projector on the basis of a color or brightness determination result which an image processing circuit 26 outputs on the basis of the output from the image pickup element 24.

If the camera has a distance detection circuit 36, the distance distribution may be determined from a signal output from the distance detection circuit 36, and a change in three-dimensional pattern may be taken into consideration.

The camera unit has an image memory 106. An image recorded in the image memory 106 is projected as shown in FIGS. 15B and 15C. The projection image forming unit 54 of the projector is controlled by the recorded image signal.

At this time, the projection image is not formed on the entire region of the projection image forming unit 54. Instead, the projection image is formed such that it is projected on only the surface determined as a uniform surface by the uniform surface determination unit 104. The projector can project an image on the image portion shown in FIG. 17. The image is concentrated to only a portion corresponding to the uniform surface.

Figure 18:
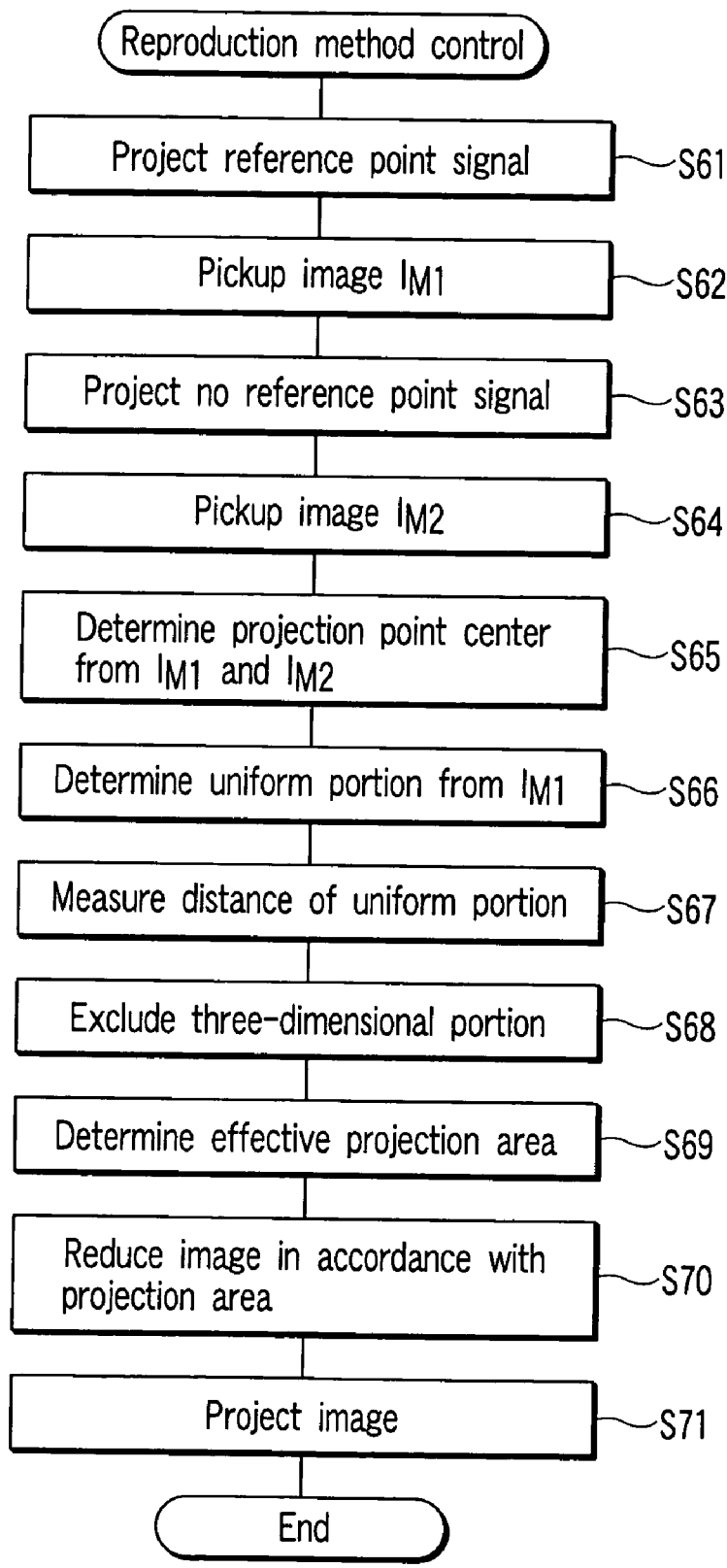
FIG. 18 is a flowchart for explaining the reproduction method control operation of a projector system according to the third embodiment of the present invention.

FIG. 18 is a flowchart for explaining the reproduction method control operation to execute such control. This operation is performed under the control of the display control unit 52.

In this flowchart, first, in step S61, a reference point signal is projected from the projector to a portion serving as a projection surface. In step S62 image picking-up (first time) is executed by the camera unit. In step S63, no reference point signal is projected from the projector. In step S64, image picking-up of second time is executed.

When image picking-up is executed twice by the camera unit, in step S65, the reference signal projection position for the portion serving as a projection surface is determined by using the difference between the two image picking-up results. Accordingly, the direction of the projector can be detected.

In step S66, the uniform part of the portion serving as a projection surface is determined on the basis of image data $I_{M2}$ when no reference point signal is projected. In step S67, the presence/absence of a three-dimensional pattern is determined by the distance detection circuit 36 for a portion that appears to be uniform in the image data. In step S68, a three-dimensional portion on the projection surface is excluded.

In step S69, a portion without any change in color or distance is determined as an effective projection area. In step S70, an image is projected to the effective projection area determined in step S69. At this time, the image is reduced in accordance with the effective projection area (effective area 90). In step S71, a photo image is projected as shown in FIG. 15B.

At this time, control is executed not only to reduce the projected image but also to project the image at a position shifted from the center of a projection enable range 96. This image reduction is executed in the following manner.

Figure 19A:
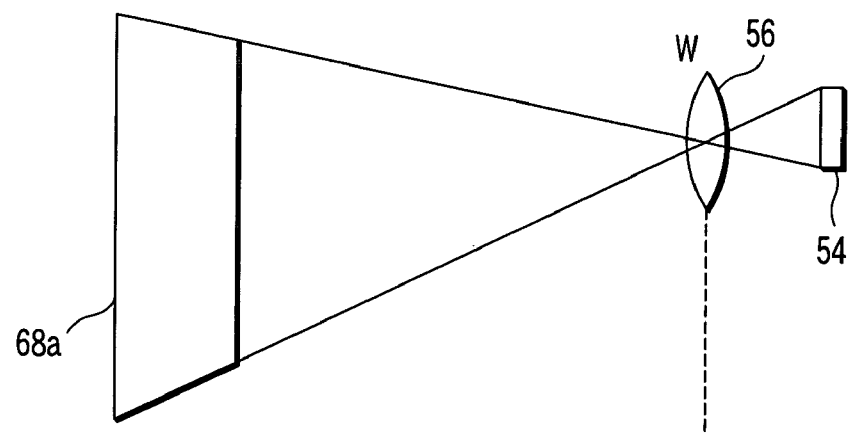
FIGS. 19A and 19B are views showing an example of control using a projecting lens 56 as a zoom lens so as to explain an example of image reduction.
Figure 19B:
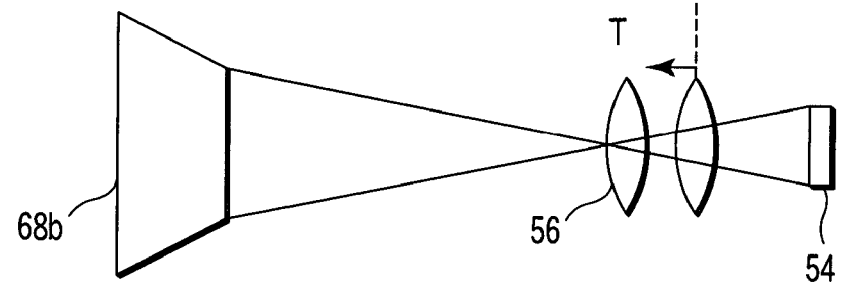

As a method, control is executed by using the projecting lens 56 as a zoom lens. For example, the projecting lens 56 set at the position shown in FIG. 19A is shifted to the long focus (T) side, as shown in FIG. 19B. Accordingly, an image 68a shown in FIG. 19A changes to an image 68b shown in FIG. 19B.

Figure 20A:
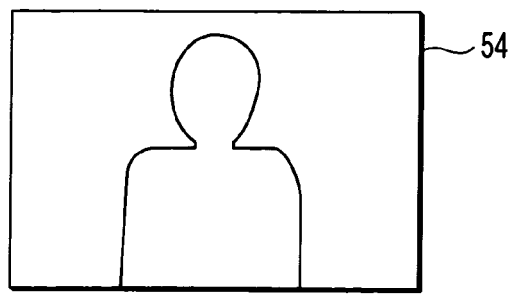
FIGS. 20A to 20C are views showing an example of control for reducing an image formed on a projection image forming unit 54 so as to explain another example of image reduction.
Figure 20B:
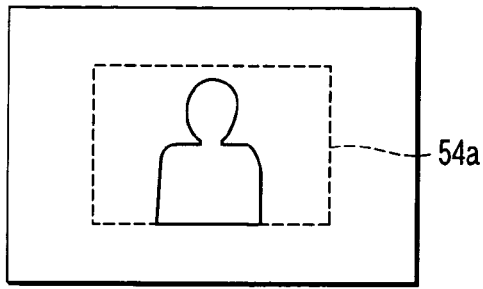
Figure 20C:
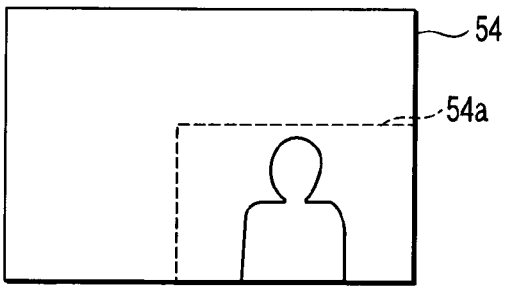

As another method, control is executed by reducing the image formed on the projection image forming unit 54. In this case, the image on the projection image forming unit 54 which is formed as shown in FIG. 20A is formed as a reduced image 54a at the central portion, as shown in FIG. 20B. Alternatively, instead of forming the reduced image 54a at the central portion, it may be formed at one of the four corners.

Figure 21A:
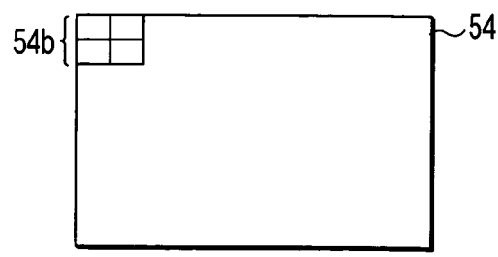
FIGS. 21A and 21B are views for explaining a reduced image forming method shown in FIG. 10B.
Figure 21B:
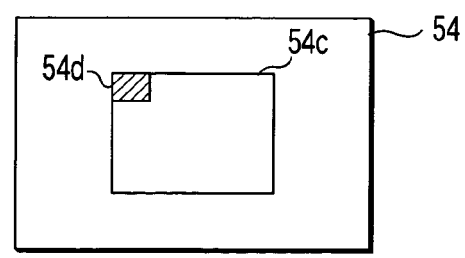

The reduced image 54a is formed by forming four pixels 54b of the image formed on the projection image forming unit 54, as shown in FIG. 21A, as one pixel 54d in a reduced image area 54c shown in FIG. 21B.

According to this arrangement, a projector system can be provided, which can detect an appropriate projection area only by directing the projector to the wall surface and project an image in an optimum size to that portion.

In the above-described embodiment, a single device is used as both the camera which photographs a projection image and the camera for projector control. Instead, the projector 14 may incorporate a dedicated camera.

The lightness or color balance of a projected image may be controlled by using other functions (photometry or white balance) of the camera.

As described above, when a projector with a high degree of freedom in image size control is used, a photo display form or photo appreciation form with high reproducibility can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projector system which includes a projector, the projector including a projection image forming unit which forms an image to be projected to a projection surface and a projecting lens, comprising:

an input unit which inputs photographic information in photographing a projection image and distance information indicating a distance $L_p$ to the projection surface, the photographic information including a size $y_c$ of an image pickup element in a predetermined direction in photographing the object, a focal length $f_c$ of a photographic lens in photographing the object, and a distance $L_c$ to the object; and a control unit which determines one of (A) a focal length $f_p$ of the projecting lens in projecting the object and (B) an effective portion $y_p$ of the projection image forming unit in accordance with the size $y_c$ of the image pickup element, the focal length $f_c$ of the photographic lens, the distance $L_c$ to the object, and the distance $L_p$ to the projection surface, to thereby control a size of the image to be formed by the projection image forming unit on the projection surface.

2. A system according to claim 1, wherein the focal length $f_p$ of the projecting lens in projecting the object is given by $f_p = f_c(L_p/L_c) \cdot (y_p/y_c)$.

3. A system according to claim 1, wherein the effective portion $y_p$ of the projection image forming unit is given by $y_p = y_c(L_c/L_p) \cdot (f_p/f_c)$.

4. A camera system comprising:

a camera having an image pickup element which forms an image of an object through a photographic lens; and a projector, the projector comprising a projection image forming unit which forms the image from the image pickup element as a projection image to be projected to a projection surface;

a projecting lens which has a variable focal length;

an input unit which inputs photographic information in photographing the projection image and distance information indicating a distance $L_p$ to the projection surface, the photographic information including information indicating a size $y_c$ of an image pickup element in a predetermined direction in photographing the object, a focal length $f_c$ of a photographic lens in photographing the object, and a distance $L_c$ to the object; and a control unit which determines one of (A) a focal length $f_p$ of the projecting lens in projecting the object and (B) an effective portion $y_p$ of the projection image forming unit in accordance with the size $y_c$ of the image pickup element, the focal length $f_c$ of the photographic lens, the distance $L_c$ to the object, and the distance $L_p$ to the projection surface, to thereby control a size of the image to be formed by the projection image on the projection surface.

5. A system according to claim 4, wherein the focal length $f_p$ of the projecting lens in projecting the object is given by $f_p = f_c(L_p/L_c) \cdot (y_p/y_c)$.

6. A system according to claim 4, wherein the effective portion $y_p$ of the projection image forming unit is given by $y_p = y_c(L_c/L_p) \cdot (f_p/f_c)$.

7. A camera system comprising:

an image pickup element which forms an image of an object through a photographic lens;

a projection image forming unit which forms the image from the image pickup element as a projection image to be projected to a projection surface;

a projecting lens which has a variable focal length $f_p$;

an input unit which inputs photographic information in photographing the projection image and distance information indicating a distance $L_p$ to the projection surface, the photographic information including information indicating a size $y_c$ of an image pickup element in a predetermined direction in photographing the object, a focal length $f_c$ of a photographic lens in photographing the object, and a distance $L_c$ to the object; and a control unit which controls the variable focal length of the projecting lens in accordance with the size $y_c$ of the image pickup element, the focal length $f_c$ of the photographic lens, the distance $L_c$ to the object, and the distance $L_p$ to the projection surface, and increases the size of the image to be formed by the projection image forming unit on the projection surface, when the variable focal length $f_p$ reaches a maximum value.

8. A system according to claim 7, wherein the focal length $f_p$ of the projecting lens in projecting the object is given by $f_p = f_c(L_p/L_c) \cdot (y_p/y_c)$.

9. A system according to claim 7, wherein when the size of the image to be formed by the projection image forming unit is increased by n times, n is expressed by the following equation:

$$n = (f_c/f_p\text{MAX}) \cdot (v_p/v_c),$$

wherein $f_p\text{MAX}$ is a maximum focal length of the photographic lens in photographing the object.

* * * * *